Patented May 17, 1932

1,858,705

UNITED STATES PATENT OFFICE

HOWARD M. GERMAN, OF CRAFTON, PENNSYLVANIA, ASSIGNOR TO UNIVERSAL STEEL COMPANY, OF BRIDGEVILLE, PENNSYLVANIA, A CORPORATION OF PENNSYLVANIA

HACK SAW BLADE

No Drawing. Application filed July 11, 1929. Serial No. 377,606.

The present invention relates to hack saw blades. It is an improvement in the hack saw blades of my prior Patent 1,616,364 of February 1, 1927.

In my prior patent I described an improved hardened steel hack saw blade containing embedded nodules of coalesced cementite of a size sufficient to serve as abrasive grains, together with a process of annealing and hardening whereby such metallic structure could be produced. In my prior patent I described the process as applied to usual hack saw steels, and also to an improved hack saw steel described in said patent which differed from the usual hack saw steels in containing tungsten preferably from about 2% to 5%, and chromium preferably from about .50% to 2.50%.

While the hack saw blades made in accordance with my prior patent had considerably better wearing qualities than the usual hack saw blades, I have found it possible to about double the wearing qualities of my prior patented hack saw blades by changing the proportions of the alloying elements. The chromium is increased materially over the chromium in my prior patent. The tungsten is also preferably increased. Preferably a small amount of vanadium is added to the alloy.

The following are two typical analyses of hack saw steels embodying my present invention:

|   | Per cent |
|---|---|
| Carbon | 1.03 |
| Manganese | .30 |
| Silicon | .30 |
| Tungsten | 3.05 |
| Chromium | 7.80 |
| Vanadium | .40 |
| Sulphur | Not over .04 |
| Phosphorus | Not over .04 |

|   | Per cent |
|---|---|
| Carbon | .84 |
| Manganese | .40 |
| Silicon | .25 |
| Tungsten | 7.95 |
| Chromium | 7.03 |
| Vanadium | .37 |
| Sulphur | Not over .04 |
| Phosphorus | Not over .04 |

The hack saw steels of the compositions herein set forth may be melted in the usual steel making furnaces, such as electric or crucible furnaces, cast in ingots, and rolled into sheets. The hack saw blades are made from the sheets in accordance with the process set forth in my prior Patent 1,616,364, which may be briefly summarized as follows:

The sheets are given an annealing treatment at about 1425° to 1475° Fahrenheit, being held at this temperature for about eighteen hours and then allowed to cool slowly in the furnace. This special annealing treatment causes the coalescence of the free cementite or carbides into small nodules or spheroids of a size sufficient to serve as abrasive grains in the finished saw blade. The sheets are cut and formed into the hack saw blades which are hardened by heating them just above the critical point and then quickly quenching in oil. The blades are afterward drawn or tempered to toughen them.

The hack saw blades as thus made have the embedded nodules of coalesced cementite of a size sufficient to serve as abrasive grains, as set forth in my prior patent, but as hereinafter described, these nodules are somewhat more numerous, larger, harder, and have an increased resistance against disintegration under the frictional heat incident to the use of the saw. Also, the steel matrix is harder and tougher and more resistant to softening under the frictional heat of use.

The hack saw blades as made of the steels described above have about double the wearing qualities of the hack saw blades made of the steel described in my prior patent. The chromium and tungsten both tend to form carbides which go into the coalesced cementite nodules and make the nodules somewhat harder and larger. Some of the chromium and tungsten carbides also go into solution in the matrix and make it structurally stronger and stiffer, as well as raising the softening point of the matrix so that the matrix will resist softening under the frictional heat to which the hack saw is subjected in use. This is important because under the frictional heat of use of the hack saw the matrix tends to become softened and to lose the structural strength requisite to properly support the abrasive nodules and cementite. Apparently the increased amount of chromium and tungsten carbides in the nodules themselves increases the ability of the nodules to resist disintegration under the frictional heat of use. The increase in the chromium content also seems to make the abrasive nodules not only larger and harder, but also more numerous.

The vanadium, which is preferably added, tends to make the free cementite nodules more stable and resistant to disintegration under the heat incident to the work of the saw. The vanadium enters both the nodules and the matrix and tends to make them both tougher.

The nodules, as described in my prior patent, consist of iron carbide and cementite, together with the alloying metals or their carbides, such as the chromium and tungsten carbides in combination with the iron carbide. The term "cementite" is therefore used in the present application, as it is in my prior patent, as a term of general definition and not of limitation, and to include not only the pure iron carbide, but also the impure cementite containing the alloying metals or their carbides in combination with the iron carbide. Such free cementite is often referred to as carbides or free carbides.

The proportions of the alloying metals may be varied from the specific analyses set forth above. For example, the carbon may vary from about .70% to 1.30%, preferably from about .80% to 1.10%. The increase in the chromium and tungsten permits the carbon to be somewhat lowered from the ranges set forth in my prior patent, thus tending to increase the toughness of the steel.

The chromium is higher than that set forth in my prior patent, being in excess of 3% but not over about 12%, preferably from about 6% to 9%, and usually about 7% to 8%.

The tungsten may be within the ranges set forth in my prior patent, but preferably averages somewhat higher. The tungsten may vary from about 2% to 12%, preferably from about 2% to 10%, and usually from about 3% to 8%.

The steel also preferably has a small vanadium addition. The vanadium may vary from an effective amount up to about 3%, preferably from about .20% to .50%.

The manganese, silicon, sulphur and phosphorus may vary within the usual ranges for steels of this character and as set forth in my prior patent, the manganese being preferably about .20% to .50%, the silicon preferably about .15% to .30%, and the sulphur and phosphorus preferably not over about .04% each.

I have also found that the addition of vanadium also improves the hack saw blades made in accordance with the process and steels described in my said prior patent, since the vanadium tends to render the carbide nodules more stable and to toughen the matrix.

While I have specifically described the preferred embodiments of my invention, it is to be understood that the invention is not so limited, but may be otherwise embodied within the scope of the following claims.

I claim:

1. A hardened steel hack saw blade containing chromium in excess of 3% but not over about 12% and tungsten about 2% to 12%, and containing embedded abrasive nodules of cementite.

2. A hardened steel hack saw blade containing chromium about 6% to 9% and tungsten about 3% to 8%, and containing embedded abrasive nodules of cementite.

3. A hardened steel hack saw blade containing chromium about 7% to 8% and tungsten about 3% to 8%, and containing embedded abrasive nodules of cementite.

4. A hardened steel hack saw blade containing chromium in excess of 3% but not over about 12%, tungsten from about 2% to 12% and an effective amount of vanadium up to about 3%, and containing embedded abrasive nodules of cementite.

5. A hardened steel hack saw blade containing chromium about 6% to 9%, tungsten about 2% to 10% and vanadium about .20% to .50%, and containing embedded abrasive nodules of cementite.

6. A hardened steel hack saw blade containing embedded nodules of coalesced cementite of a size sufficient to serve as abrasive grains, and containing an effective amount of vanadium up to about 3%.

7. A hardened steel hack saw blade containing embedded nodules of coalesced cementite of a size sufficient to serve as abrasive grains, and containing about .20% to .50% vanadium.

8. As an intermediate product in the manufacture of steel hack saw blades, an annealed steel sheet containing chromium in excess of 3% but not over about 12% and tungsten about 2% to 12%, and containing embedded abrasive nodules of cementite.

9. As an intermediate product in the manufacture of steel hack saw blades, an annealed steel sheet containing chromium about 6% to 9% and tungsten about 3% to 8%, and containing embedded abrasive nodules of cementite.

10. As an intermediate product in the manufacture of steel hack saw blades, an annealed steel sheet containing chromium about 7% to 8% and tungsten about 3% to 8%, and containing embedded abrasive nodules of cementite.

11. As an intermediate product in the manufacture of steel hack saw blades, an annealed steel sheet containing chromium in excess of 3% but not over about 12%, tungsten from about 2% to 12% and an effective amount of vanadium up to about 3%, and containing embedded abrasive nodules of cementite.

12. As an intermediate product in the manufacture of steel hack saw blades, an annealed steel sheet containing chromium about 6% to 9%, tungsten about 2% to 10% and vanadium about .20% to .50%, and containing embedded abrasive nodules of cementite.

13. As an intermediate product in the manufacture of steel hack saw blades, an annealed steel sheet containing embedded nodules of coalesced cementite of a size sufficient to serve as abrasive grains, and containing an effective amount of vanadium up to about 3%.

14. As an intermediate product in the manufacture of steel hack saw blades, an annealed steel sheet containing embedded nodules of coalesced cementite of a size sufficient to serve as abrasive grains, and containing about .20% to .50% vanadium.

15. A hardened steel hack saw blade containing embedded nodules of coalesced cementite of a size sufficient to serve as abrasive grains, and containing about .20% to 3% vanadium.

16. As an intermediate product in the manufacture of steel hack saw blades, an annealed steel sheet containing chromium about 7% to 12% and tungsten about 2% to 12%, and containing embedded abrasive nodules of cementite.

In testimony whereof I have hereunto set my hand.

HOWARD M. GERMAN.